(12) United States Patent
Rollins

(10) Patent No.: US 6,327,349 B1
(45) Date of Patent: Dec. 4, 2001

(54) METHOD AND APPARATUS FOR IDENTIFYING A RATE CENTER USING A LOCATION ROUTING NUMBER

(75) Inventor: John Charles Rollins, Southlake, TX (US)

(73) Assignee: GTE Service Corporation, Irving, TX (US)

( * ) Notice: Subject to any disclaimer, the term of this patent is extended or adjusted under 35 U.S.C. 154(b) by 0 days.

(21) Appl. No.: 09/420,986

(22) Filed: Oct. 20, 1999

(51) Int. Cl.⁷ .................................................. H04M 15/00
(52) U.S. Cl. .................. 379/114.27; 379/115.01; 379/220
(58) Field of Search .............. 379/111–113, 114, 379/115, 219–220

(56) References Cited

U.S. PATENT DOCUMENTS

| | | | |
|---|---|---|---|
| 5,910,981 | 6/1999 | Bhagat et al. | 379/219 |
| 5,943,411 | 8/1999 | Houck et al. | 379/219 |
| 5,949,870 | 9/1999 | Hayduk et al. | 379/221 |
| 6,078,657 | * 6/2000 | Alfieri et al. | 379/220 |

* cited by examiner

Primary Examiner—Wing F. Chan
Assistant Examiner—Barry W Taylor
(74) Attorney, Agent, or Firm—Leonard Charles Suchyta; James K. Weixel

(57) ABSTRACT

In a telephone network supporting local number portability, a system and method for assigning a location identifier uses a location routing number to identify the geographic location of a customer. A local carrier assigns a telephone number to a customer. The local carrier then assigns a location routing number to the telephone number. A first portion of the location routing number represents routing information and a second portion represents the location of the customer. The second portion may then be used to determine billing.

24 Claims, 6 Drawing Sheets

| ENTRY | TELEPHONE NUMBER 310 | LRN 320 |
|---|---|---|
| 1 | 972-718-0001 | 972-887-765X |
| 2 | 972-718-1234 | 972-887-481X |
| 3 | 972-718-9876 | 972-718-481X |
| | | |
| | | |
| | | |

300

| ENTRY | TELEPHONE NUMBER 310 | LRN 320 |
|---|---|---|
| 1 | 972-718-0001 | 972-887-765X |
| 2 | 972-718-1234 | 972-887-481X |
| 3 | 972-718-9876 | 972-718-481X |
| | | |
| | | |
| | | |

METHOD AND APPARATUS FOR IDENTIFYING A RATE CENTER USING A LOCATION ROUTING NUMBER

FIELD OF THE INVENTION

The present invention relates generally to identifying location information associated with telephone customers and, more particularly, to identifying location information in a local number portability environment.

BACKGROUND OF THE INVENTION

Traditionally, a single company operating in a defined service area has provided local telephone service to all users in that service area. In today's competitive telecommunications environment, however, new carriers have begun providing local telephone service in areas formerly served exclusively by a single carrier. To provide local telephone service, each local carrier, also known as a local service provider (LSP), must obtain a block of 10,000 telephone numbers for each rate area they serve. The reason for this is that the LSP uses the customer's telephone number exclusively to determine where the customer is located for billing purposes.

For example, a new carrier may obtain a block of numbers defined by NPA-NXX-XXXX to provide local telephone service, where NPA represents the area code, NXX represents the central office location code and XXXX represents the unique numbers for specific customers. The combination of NPA-NXX, however, provides 10,000 numbers that can only be used to serve customers living within a defined geographic area known as a rate center. The rate center is used for billing purposes. If the LSP wishes to provide service to customers residing in a different rate center, the LSP must obtain another block of numbers defined by a different NPA-NXX to provide service in the other rate center.

A problem with such a system is that the number resource is being exhausted as the competition for local telephone service increases. A need therefore exists for a method to reduce strain on the current numbering resource caused by the increase in LSPs.

SUMMARY OF THE INVENTION

Systems and methods consistent with the present invention address this need by using a portion of the location routing number (LRN) associated with local number portability (LNP) to identify the geographic location associated with the calling and called parties. In this manner, a resource other than the telephone number may be used to determine the proper billing associated with a telephone call, thereby eliminating the need for an LSP to obtain separate blocks of numbers for each rate center served. The billing entity identifies the rate center information based on the geographic location and is then able to accurately bill a customer for telephone calls.

In accordance with the purpose of the invention as embodied and broadly described herein, a method for assigning a location routing number consistent with the present invention may be implemented in a telephone network supporting local number portability. The method includes providing a telephone number to a customer and assigning a location routing number to the telephone number. A first portion of the location routing number represents routing information and a second portion represents the location of the customer.

In another aspect of the present invention, a system for determining location information for billing a telephone call to a customer includes a memory configured to store data representing telephone numbers and location routing numbers corresponding to each respective telephone number. The system also includes a processor configured to receive an input representing a call, search the memory for the location routing number associated with the call, identify location information associated with the call based on the location routing number, and determine a rate center associated with the call based on the location information.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

FIG. 4 is an example of an LNP database consistent with the present invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims. Methods and systems consistent with the present invention assign LRNs so that a billing entity may identify the geographic location associated with calling and called parties. The billing entity may then determine billing information associated with a call using a resource other than the telephone number.

Exemplary Systems Configuration

Figure 1:
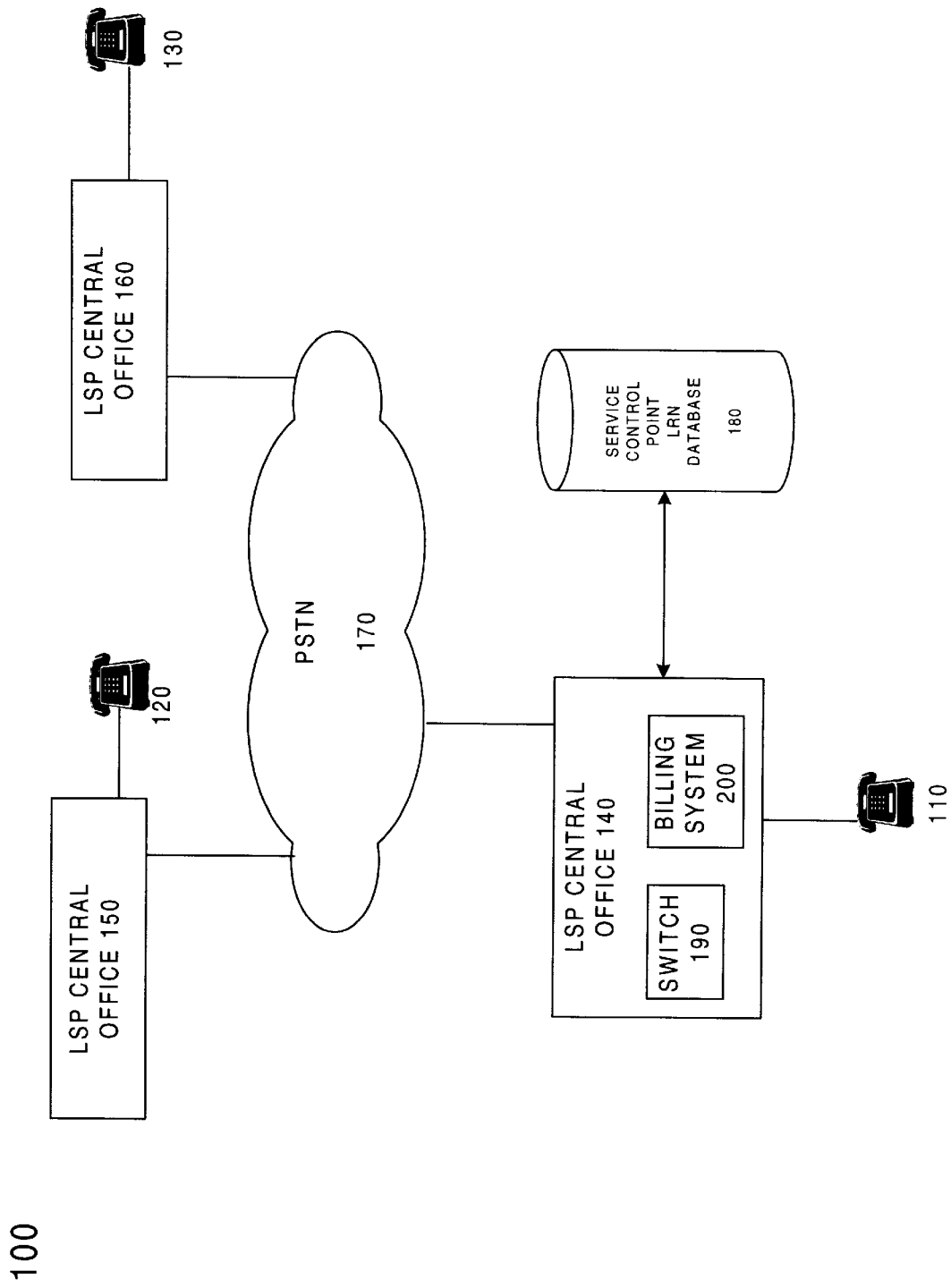
FIG. 1 is a block diagram of an exemplary network consistent with the present invention.

FIG. 1 is a diagram of an exemplary communications network 100 operating n an LNP environment consistent with the present invention. The network 100 includes telephones 110, 120 and 130. These phones are depicted as conventional telephones. Phones 110–130 may include other types of devices, however, including cellular telephones, facsimile devices, pagers, computer devices or other devices that are connected via a wired or wireless connection to a telephone network. Additionally, only three phones are shown for simplicity. The present invention is not limited, however, by the number of telephones present in the network 100.

Telephones 110, 120 and 130 are connected to LSP central offices 140, 150 and 160, respectively. The LSP central offices 140–160 connect a calling party to a called party over public switched telephone network (PSTN) 170. Each LSP central office, as illustrated by LSP central office 140, may include one or more switches 190 and a billing system 200. In alternative implementations consistent with the present invention, billing system 200 may be part of switch 190 or located outside central office 140. Each LSP central office may also be connected to a service control point (SCP) location routing number (LRN) database 180 associated with local number portability (LNP). Alternatively, each of the central offices 140–160 may access the same LRN database.

The LSP central offices 140–160 use their respective switching devices 190 to route phone calls from their customers' telephones to called parties over the PSTN 170. The details of these switching devices 190 would be known by one of ordinary skill in the art and are not shown here for simplicity. Additionally, if a called party is not within the Local Access and Transport Area (LATA) of the respective LSP central office, the LSP central office may route the call via a designated long distance inter-exchange carrier. One of ordinary skill in the art would also know that additional switches associated with routing local and long-distance telephone calls may be used to complete the telephone calls in a conventional manner.

Calls in a non-LNP environment are routed across the PSTN 170 using the first six digits of the ten-digit telephone number. The geographic location served by these six digits is assigned and stored in a national database called the Local Exchange Routing Guide (LERG). Customer numbers are assigned as ten digits in the form of NPA-NXX-XXXX, where NPA represents the area code, NXX represents the central office location code and the final four numbers are unique to specific customers.

With the advent of LNP as currently deployed and configured, customers may change LSPs and retain their ten-digit telephone number as long as they stay within their traditional geographic service area or rate center. In such conventional LNP systems, a 10-digit LRN is assigned to identify the central office serving given customer telephone numbers. Changing service providers requires porting to a new central office and associating the ported telephone number with an LRN that identifies the switch used by the new LSP to serve the customer.

The assignment of the LRN follows the same conventions as telephone number assignments, That is, an LRN is a ten-digit number that must be assigned to a central office for which that central office is the NPA-NXX LERG assignee. The LRN takes the place of the dialed telephone number and uniquely identifies a specific central office location for the purpose of routing the calls across the network in an LNP environment. The first six digits of the ten-digit LRN are used for routing purposes and the last four digits, in conventional systems, have no specific use other than to maintain the ten-digit structure recognized by the users of the LRN database 180.

A system consistent with the present invention advantageously uses the last four digits of the LRN to identify a rate center, as described in detail below. The LSP's billing system may then bill the customer based on the LRN information. The LSP may also advantageously use a block of 10,000 telephone numbers in more than one rate service area. In addition, systems and methods consistent with the present invention expand the geographic area in which customers can locate and still retain their original telephone number. That is, the customer is not restricted to the rate center in which the telephone number was originally assigned.

Exemplary Billing System

Figure 2:
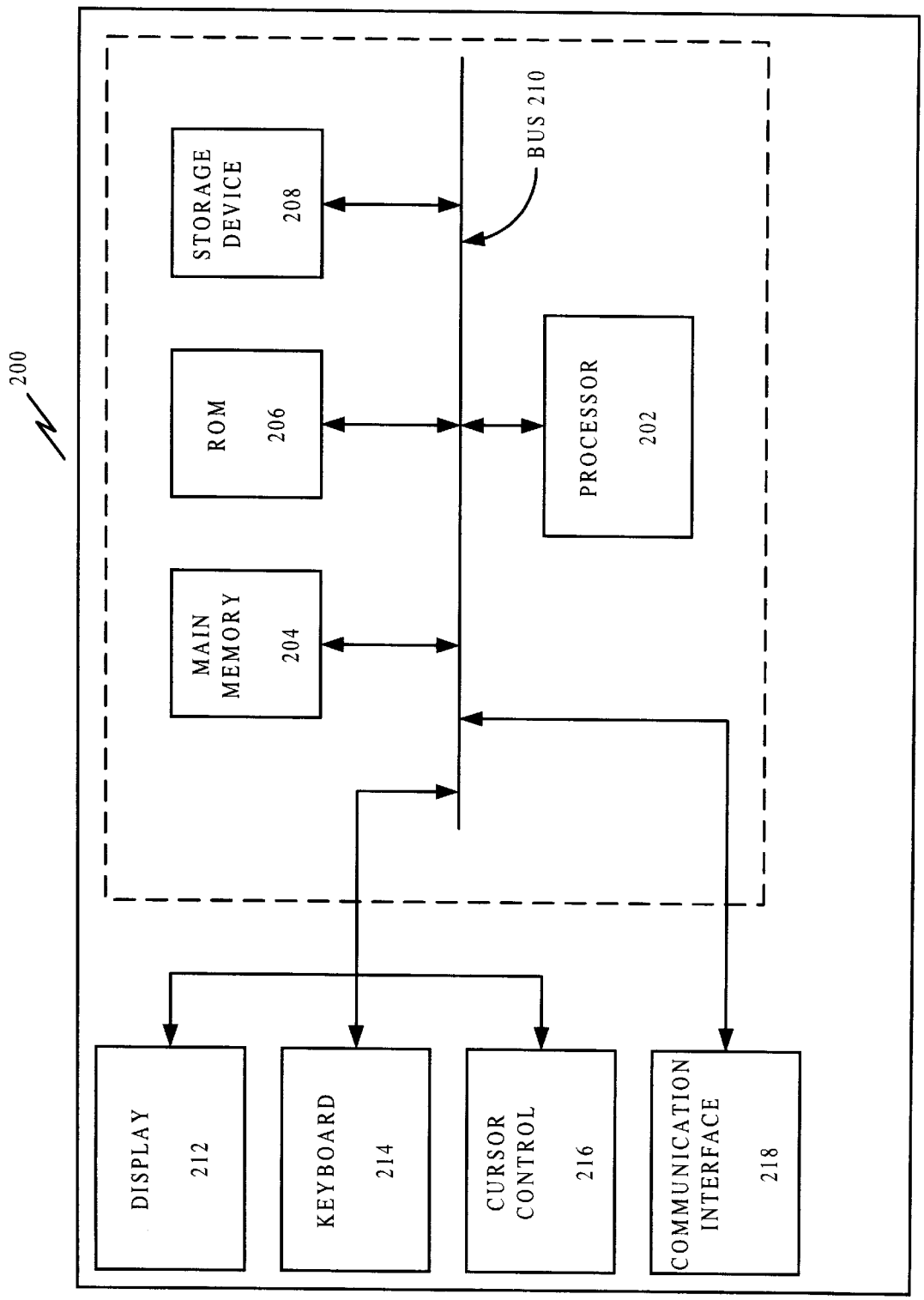
FIG. 2 is a block diagram of an exemplary billing system consistent with the present invention.

FIG. 2 is a block diagram of a billing system 200 with which methods and systems consistent with the present invention may be implemented. Billing system 200 includes a bus 210 or other communication medium for communicating information, and a processor 202 coupled to bus 210 for processing information. Billing system 200 further includes a random access memory (RAM) or other dynamic storage device 204 (referred to as main memory) coupled to bus 210 for storing information and instructions to be executed by processor 202. Main memory 204 also may store temporary variables or other intermediate information used during execution of instructions by processor 202. Billing system 200 also includes a read only memory (ROM) and/or other static storage device 206 coupled to bus 210 for storing static information and instructions for processor 202. A data storage device 208, such as a magnetic disk or optical disk and its corresponding disk drive, can be coupled to bus 210 for storing information and instructions.

Billing system 200 includes display device 212 coupled to bus 210. Display device 212 may be a cathode ray tube (CRT) for displaying information to a user. Billing system 200 further includes a keyboard 214 and a cursor control 216, such as a mouse.

Billing system 200 also includes communication interface 218 connected to bus 210. Communication interface 218 enables billing system 200 to communicate with other devices/systems via any communications medium. For example, communication interface 218 may be a modem or an Ethernet interface to a LAN. Alternatively, communication interface 218 can be any other interface that enables communications between billing system 200 and other devices/systems.

The billing system 200 provides accurate billing associated with telephone calls in a manner consistent with the present invention. According to one implementation, billing system 200 identifies geographic location information associated with a called or calling party in response to processor 202 executing sequences of instructions contained in memory 204. Such instructions may be read into memory 204 from another computer-readable medium, such as data storage device 208, or from a separate device via communication interface 218. Execution of the sequences of instructions contained in memory 204 causes processor 202 to perform the process steps that will be described hereafter. In alternative embodiments, hard-wired circuitry may be used in place of or in combination with software instructions to perform the process steps. Thus, the present invention is not limited to any specific combination of hardware circuitry and software.

Exemplary LRN Database

Figure 3:
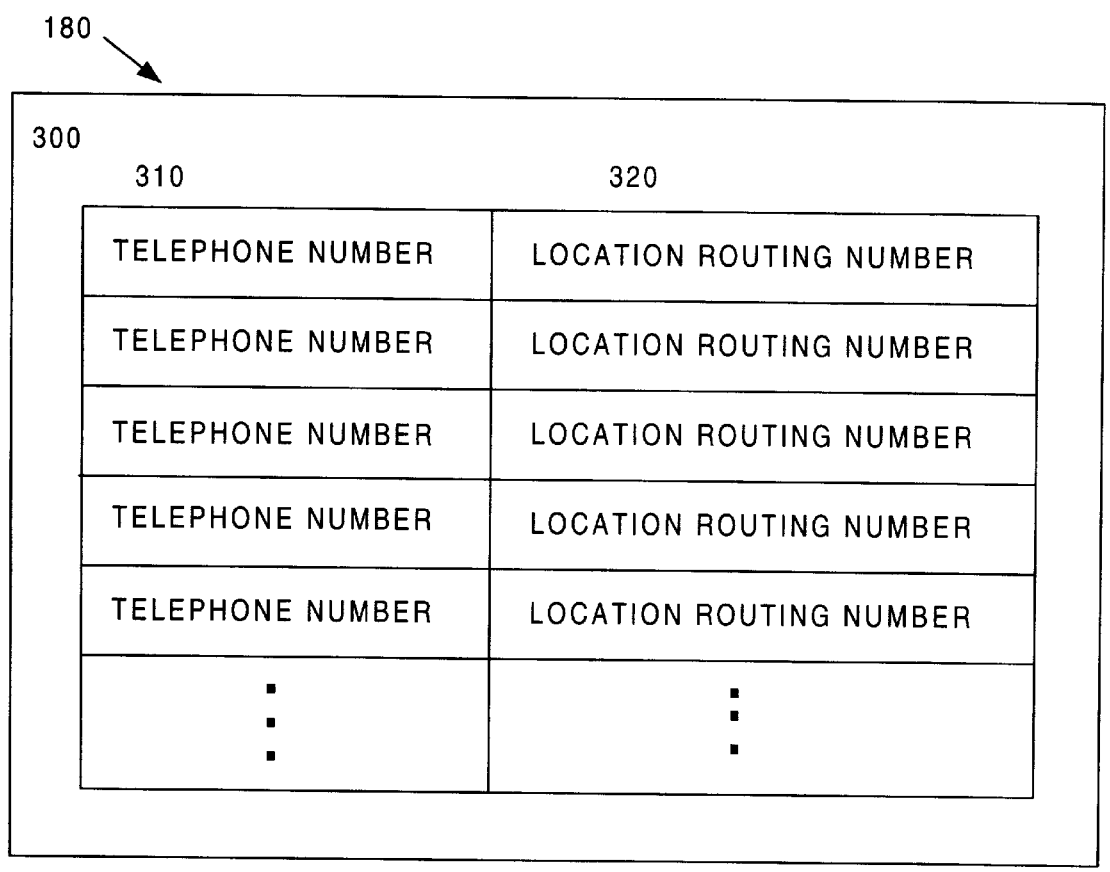
FIG. 3 is a block diagram illustrating exemplary data fields in the LNP database of FIG. 1 consistent with the present invention.

FIG. 3 is used to illustrate the structure of LRN database 180 consistent with the present invention. The LRN database 180 includes information that is available to all LSPs and long-distance carriers. Therefore, information in LRN database 180 may be maintained by a party responsible for ensuring that the data is accurately maintained, hereafter referred to as the LRN administrator. For example, the LRN database 180 may receive updates from a Number Portability Administration Center (NPAC) which provides updates to all LSPs and long distance carriers. The NPAC may download these updates to a local service management system (LSMS) which in turn downloads the information to the SCP LRN database 180. The LRN administrator may then verify that the LRN database 180 contains the most recent updates.

The database 180 includes a data table 300. The data table 300 includes data fields 310 and 320. Other data fields may also be included in data table 300. These other fields, however, are not described herein in order not to unduly obscure the thrust of the present invention. Field 310 may store ten-digit telephone numbers corresponding to customers' telephone numbers and field 320 may store ten-digit LRNs corresponding to the respective customer telephone numbers.

In an exemplary implementation consistent with the invention, customers staying within the central office and geographic serving area based on the LERG assignment require no LRN database 180 entry or LRN assignment. In this manner, if no LRN is located in the LRN database 180, the LSP performs the billing and routing as is normally done in a non-LNP environment. Customers that change LSPs or central offices or move to a new rate center served by their current LSP, however, require a listing in LRN database 180. In an exemplary implementation consistent with the invention, each LSP assigns a ten-digit telephone number and a corresponding LRN for each customer whose telephone number was originally served by a different central office when the number was assigned and for each customer who moves to a new rate center.

As described previously, if the customer stays within the original rate center and is served by the original central office, no LRN database 180 entry is required. However, if the customer wishes to move outside the rate center, the LSP provides an LRN associated with the customer's telephone number. For example, referring to FIG. 4, assume that the LSP assigns the telephone number 972-718-0001 to a particular customer. Further assume the customer decides to move outside his/her current rate center area. The LSP then assigns an LRN to the customer's telephone number to ensure that the telephone calls are properly routed and billed. The LSP assigns the first six digits of the LRN based on an NPA-NXX that is stored in the LERG and represents the new central office serving that customer. For example the LSP may assign 972-887 as the first six digits of the LRN, indicating that the central office identified by 887 in the 972 NPA now routes that customer's telephone calls. These central office codes are stored in the LERG database and may be correlated to specific rate centers.

The LSP then assigns the last four digits of the LRN to provide additional geographic information. More specifically, three of the last four numbers of the LRN represent a central office location code recognized by local carriers as assigned to a specific central office associated with a specific rate center. For example, assume that the customer having telephone number 972-718-0001 moves to a geographic area identified in the LERG database as correlating to a rate center served by the central office code 765 in the 972 NPA. In this example, the LSP then assigns 765X as the last four digits of the LRN. In summary, in this example, the LSP assigns the LRN of 972-887-765X to the telephone number 972-718-0001, as indicated by entry 1 in FIG. 4. The first six digits, 972-888, represent a central office code for routing the telephone calls and the last four digits, 765X, represent the rate center of the customer. The billing system 200 then uses the location code and rate center information to generate billing information associated with telephone calls to/from 972-718-0001. The other LRNs are assigned in a similar manner.

For example, assume that most of the ported customers of the LSP reside within the rate center defined by 972-765, but are served by the LSP central office designated by 972-887. In this situation, each of the LRNs in table 300 corresponding to these telephone numbers includes the same LRN, 972-887-765X.

Assume however, that the LSP also wishes to provide customer service to customers, via the central office identified by 972-887, that are located in a rate center area served by the prefix 972-481. For example, assume that the customer who is assigned telephone number 972-718-1234 resides within an area defined by the NPA-NXX prefix 972-481. In this case, the LSP assigns the first six digits of the LRN to match the location of the serving central office. That is, the LSP assigns 972-887 as the first six digits. The LSP then assigns the last four digits based on the geographic location of the customer. In this example, the LSP assigns 481X as the last four numbers of the LRN, as indicated by entry 2 in table 300 (FIG. 4). This indicates that the customer having telephone number 972-718-1234 is served by a central office represented by 972-887 and resides in a location defined by the prefix 972-481.

The switch 190 still routes the call based on the first six digits of the LRN. The last four digits, however, represent the actual location of the customer for billing purposes. In this manner, a local carrier with one central office can serve customers residing in areas that include multiple rate centers using only one assigned NPA-NXX. Calls may then be properly rated by analyzing the last four digits of the LRN prior to completing the call, as described in more detail below.

Exemplary Processing for Assigning Location Routing Numbers

Figure 5:
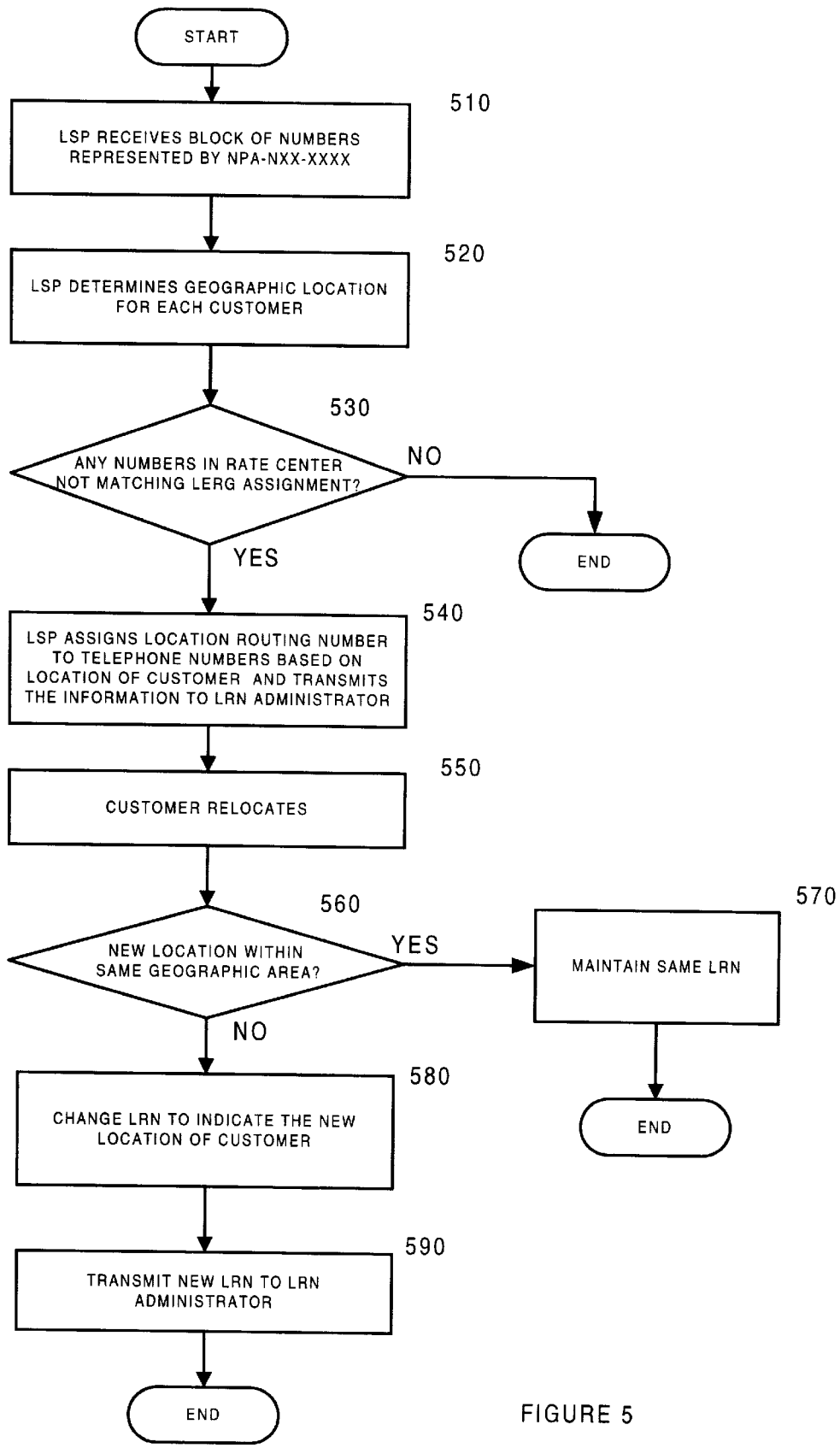
FIG. 5 is a flowchart of processing for assigning LRNs in a manner consistent with the present invention.

FIG. 5 is a flowchart illustrating exemplary processing for assigning LRNs in a manner consistent with the present invention. Assume that a local carrier represented by LSP central office 140 in FIG. 1 wishes to provide local telephone service in a particular area. The LSP 140 applies for a block of numbers to the party responsible for maintaining the LERG database, referred to hereafter as the LERG administrator. In an exemplary embodiment, assume that the LSP 140 wishes to provide telephone service within the 972 area code and assume that the LERG administrator assigns the block 972-718-XXXX to the LSP 140. The LERG administrator then stores this information in the LERG database. The information in the LERG database is available to all local and long distance carriers.

The LSP 140 receives the block of numbers defined by 972-718-XXXX (step 510). Next, the LSP 140 determines the geographic area associated with each individual customer's location (step 520). For example, a customer may be within the geographic area defined by the prefix 972-718. Alternatively, the customer may be within the geographic area defined by the prefix 972-481, or other NPA-NXX prefixes in which the LSP 140 provides service. These other areas, such as that defined by 972-481, may be assigned to another LSP in the LERG database.

The LSP 140 then determines whether any customers are located in a rate center not assigned in the LERG to 972-718 (step 530). If so, the LSP assigns an LRN based on the customer's location (step 540). Otherwise, no LRN is necessary. When an LSP queries the LRN database 180 and does not find an entry corresponding to the customer's telephone number, the LSP routes and bills the call based on 972-718.

However, for each customer located in another rate center, the LSP 140 assigns an LRN based on the particular location. For example, for each of the customers located in the rate center area defined by 972-481, the LSP 140 assigns an LRN of 972-718-481X. The LRNs for other areas defined by other NPA-NXX prefixes are similarly assigned. The LSP 140 transmits the LRN assignment information to the LRN administrator for storage in the LRN database 180 (step 540).

Now assume that a customer currently having an LRN wishes to be "ported," that is, move to another location and maintain his/her current phone number (step 550). The LSP 140 determines whether the customer's new location is within the rate center area defined by the last four digits of the current LRN (step 560). If so, the LSP 140 maintains the same LRN (step 570). Otherwise, the LSP 140 assigns a new LRN for the customer's phone number (step 580). For example, suppose a customer, having the telephone number 972-718-0001 and LRN 972-887-765X (entry 1 in FIG. 4), moves to a location defined by the prefix 972-481. The LSP 140 changes the LRN to 972-887-481X. In this manner, the last four digits of the LRN represent the new location of the customer for billing purposes.

The LSP 140 then transmits the new LRN to the LRN administrator so that the LRN database 180 reflects the current location of the telephone customer (step 590). The calls continue to be routed to the central office represented by the first six digits of the LRN. The last four digits now represent the actual location of the customer. Thus, the routing and the rating functions have been advantageously separated. This enables a single central office to provide telephone service in more than one rate center area without having to acquire another block of numbers from the LERG administrator.

The fourth of the last four digits of the LRN may be used to further subdivide a geographic region, may be randomly assigned or may be used to signify that special dialing plans exist. For example, if a region defined by an NPA-NXX is divided into different rate centers, the fourth digit may be used to represent a portion of the subdivided region. Alternatively, if calls within a given NPA are all rated as local, the fourth digit may be set to a predetermined value, such as zero. Additionally, if geographic portability is not used, the fourth digit may be set to a predetermined value, such as zero.

Exemplary Processing for Generating Billing Information

Figure 6:
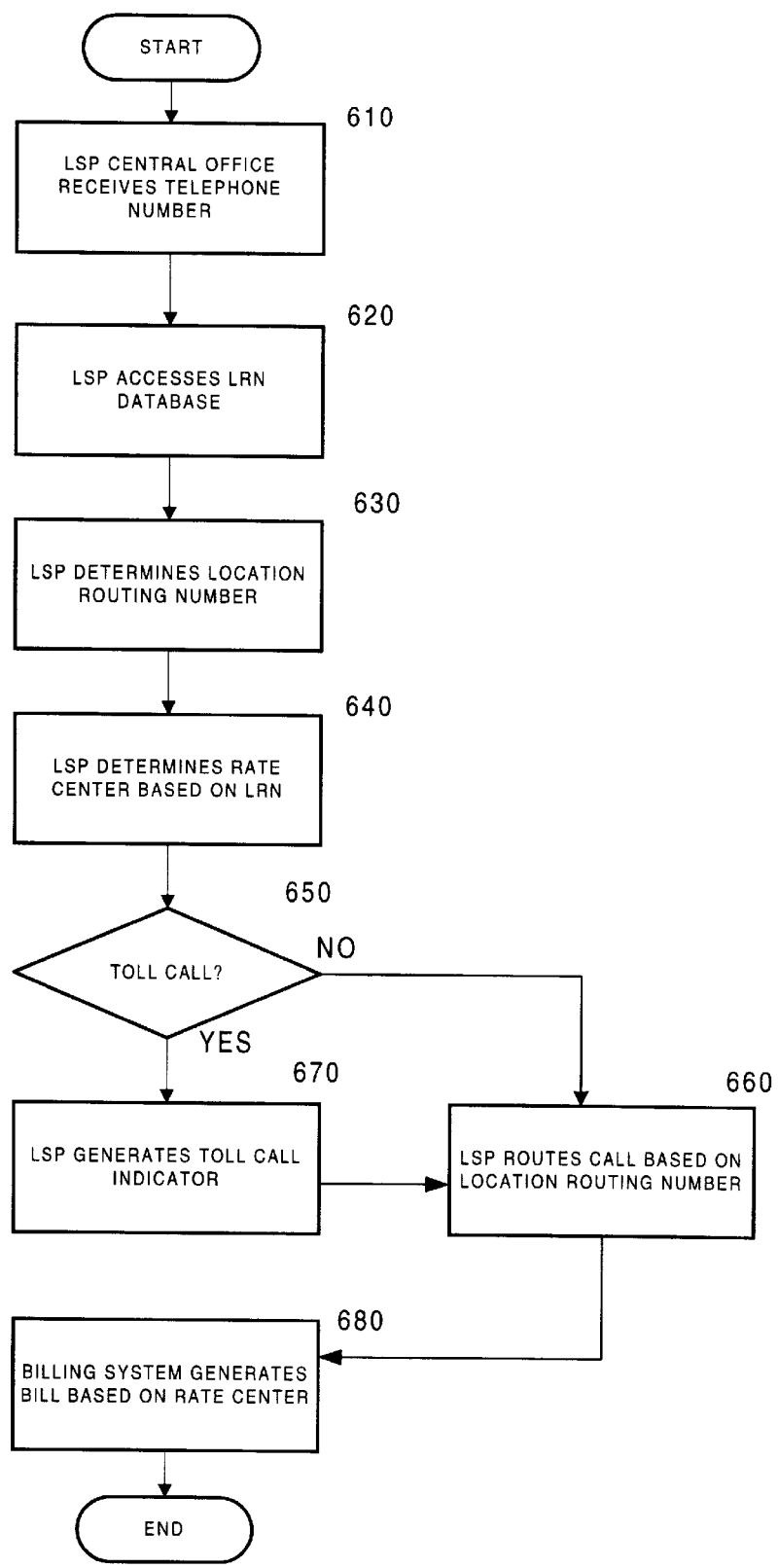
FIG. 6 is a flowchart of processing for billing a customer in a manner consistent with the present invention.

FIG. 6 illustrates processing associated with generating billing information consistent with the present invention when a calling party dials a telephone number. The LSP central office serving that calling party, such as LSP 140, receives the telephone number of the called party (step 610). Assume that the calling party is a customer in an area defined by the prefix 972-718 and dials the number 972-718-9876 (i.e., entry 3 in FIG. 4). Assume that this customer has ported to an area defined by the prefix 972-481. The LSP 140 accesses the SCP LRN database 180 (step 620). The LSP 140 then checks the LRN table 300 to identify the LRN associated with the telephone number (step 630). As described previously, the first six digits of the LRN represent the central office location for routing purposes and the last four digits represent the actual customer's location. Additionally, as described previously, when a customer has not changed LSPs or has not ported to a new rate center area, no LRN exists in the LRN database 180. In this case, the LSP routes and bills calls in the manner conventionally done in a non-LNP environment.

The billing computer 200 identifies the last four digits of the LRN and determines the actual location of the called party (step 640). The billing computer 200 then correlates the actual location information of the called party to a rate center. In this example, the LSP billing system 200 analyzes the last four digits of the LRN, i.e., 481X, and determines that the called party is in the area defined by the prefix 972-481. The billing system 200 correlates this information into a rate center using known information stored in the LERG. Alternatively, a table correlating the NPA-NXX prefixes to various rate centers may be stored locally by the billing system 200, for example on storage device 208 (FIG. 2).

After the billing computer 200 determines the location and corresponding rate center of the called party, the LSP 140 determines if the call is a toll call (step 650), prior to completing the call. If the call is not a toll call, the switch 190 completes the call (step 660). If the call is to be rated as a toll call, the LSP 140 may provide a recording or distinctive tone to alert the caller that the call is a toll call (step 670). The billing system 200 or the switch 190 may perform this function. In either case, the toll call indication may be particularly useful in a LNP environment where a customer's location may not be discerned from the phone number. Steps 650 and 670 may be bypassed in certain embodiments consistent with the present invention where toll indicators are not required by the appropriate regulatory body.

After the toll indication has been made, the LSP 140 routes the call based on the first six digits of the LRN (step 660). When the call is finished, the billing system 200 generates billing information based on the rate center and the duration of the call (step 680).

Systems and methods for assigning location routing numbers to identify the geographic location of telephone customers in a manner consistent with the present invention permit local carriers to identify the location of customers using a resource other than the telephone number. Local carriers may assign telephone numbers to customers residing in different rate centers using a block of numbers defined by the same NPA-NXX prefix. A system consistent with the present invention also advantageously enables a billing system to accurately bill customers for calls by using the LRN to determine a rate center, thereby avoiding using the telephone number to determine the rate center. Since the LSP assigns the last four digits of the LRN based on information stored in the LERG database, this ensures that the billing information will be accurate.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the present invention is described in an environment where the LSPs operate within a geographic area defined by a single NPA. The present invention, however, may be modified to operate in areas including multiple NPAs, such as a nationwide system.

What is claimed is:

1. In a telephone network supporting local number portability, a method for assigning a location routing number, comprising:

providing a telephone number to a customer;

determining whether the customer is located in a rate center associated with the telephone number; and assigning a location routing number to the telephone number based on whether the customer is located in a rate center that is associated with the telephone number, a first portion of the location routing number comprising an area code and a first central office code and a second portion of the location routing number comprising a second central office code.

2. The method of claim 1, further comprising:
storing the telephone number and the location routing number in a memory.

3. The method of claim 2, wherein the storing includes:
permitting shared access to the memory.

4. The method of claim 1, wherein the second central office code relates to a location of the customer for billing purposes.

5. The method of claim 1, wherein the second portion comprises four digits, three of the four digits comprising the second central office code, the second central office code relating to an area in which the customer resides and one of the four digits representing a subdivision of the area.

6. The method of claim 1, wherein the second portion comprises four digits, three of the four digits comprising the second central office code and one of the four digits identifying a dialing plan.

7. A system for determining location information for billing a telephone call to a customer, comprising:
a memory configured to store data representing telephone numbers and data representing location routing numbers corresponding to each respective telephone number, a first portion of the location routing number comprising an area code and a first central office code and a second portion of the location routing number comprising a second central office code; and
a processor configured to:
receive an input representing a call,
search the memory for the location routing number associated with the call,
identify location information associated with the call based on the second central office code, and
determine a rate center associated with the call based on at least the second central office code.

8. The system of claim 7, wherein the processor is further configured to generate billing information based on the determined rate center.

9. The system of claim 7, wherein the processor is further configured to:
determine whether the call represents a toll call based on the determined rate center, and
generate an indication to a calling party when the call represents a toll call.

10. The system of claim 7, wherein the processor is further configured to determine the rate center associated with a called party based on at least the second central office code.

11. The system of claim 7, wherein the second portion of the location routing number comprises four digits, three of the four digits comprising the second central office code, the second central office code relating to an area in which the called party resides and at least one digit relating to a dialing plan or a subdivision of the area.

12. The system of claim 7, further comprising:
a switching device configured to route the call based on the location routing number.

13. A computer-readable medium having stored thereon a plurality of sequences of instructions, said instructions including sequences of instructions which, when executed by a processor, cause said processor to perform the steps of:
searching a memory, in response to receipt of a call for a called party, for a location routing number associated with the called party, a first portion of the location routing number comprising an area code and a first central office code and a second portion of the location routing number comprising a second central office code;
identifying location information associated with the call from the second central office code; and
determining a rate center associated with the call based on at least the second central office code.

14. The computer-readable medium of claim 13, further including instructions for causing said processor to perform the further step of:
generating billing information based on the determined rate center.

15. The computer-readable medium of claim 13, further including instructions for causing said processor to perform the further steps of:
determining whether the call represents a toll call based on the determined rate center; and
generating an indication to a calling party prior to completing the call when the call represents a toll call.

16. The computer-readable medium of claim 13, further including instructions for causing said processor to perform the further step of:
determining a rate center associated with the called party based on at least the second central office code.

17. The computer-readable medium of claim 13, wherein the second portion of the location routing number comprises four digits, three of the four digits comprising the second central office code, the second central office code relating to an area associated with the called party and at least one digit relating to a dialing plan or a subdivision of the area.

18. A system for determining location information for billing a telephone call, comprising:
means for storing data representing telephone numbers and corresponding location routing numbers, a first portion of the location routing number comprising an area code and a first central office code and a second portion of the location routing number comprising a second central office code;
means for receiving an input representing a call; and
means for identifying a rate center associated with the call based on the location routing number.

19. A computer-readable memory device containing a data structure relating to a telephone network, comprising:
a first area that stores data representing telephone numbers; and
a second area that stores data representing location routing numbers, a first portion of the location routing number representing an area code and a first central office code and a second portion of the location routing number representing a second central office code.

20. The computer-readable memory device of claim 19, wherein the second central office code relates to a rate center associated with a telephone number stored in the first area, the location routing number including a third portion relating to at least one of a dialing plan and a subdivision of the rate center.

21. In a telephone network supporting local number portability, a method for assigning a location routing number, comprising:
providing a telephone number to a customer; and
assigning a location routing number to the telephone number, when the customer moves to location outside a rate area associated with the telephone number, a first portion of the location routing number comprising an area code and a first central office code and a second portion of the location routing number comprising a second central office code.

22. The method of claim 21, further comprising:

storing the telephone number and the location routing number in a memory.

23. The method of claim 21, wherein the assigning includes assigning the location routing number when the telephone number is ported to a location in a different rate center.

24. The method of claim 21, wherein the second portion of the location routing number comprises four digits, three of the four digits comprising the second central office code, the second central office code relating to an area associated with the location of the customer and at least one digit relating to a dialing plan or a subdivision of the area.

\* \* \* \* \*